June 6, 1972  E. J. STURDEVANT  3,667,946
SURFACE TREATMENT OF PHOTOPOLYMER FILM USED
FOR RECORDING HOLOGRAMS
Filed Sept. 23, 1970  2 Sheets-Sheet 1

June 6, 1972  E. J. STURDEVANT  3,667,946
SURFACE TREATMENT OF PHOTOPOLYMER FILM USED
FOR RECORDING HOLOGRAMS
Filed Sept. 23, 1970  2 Sheets-Sheet 2
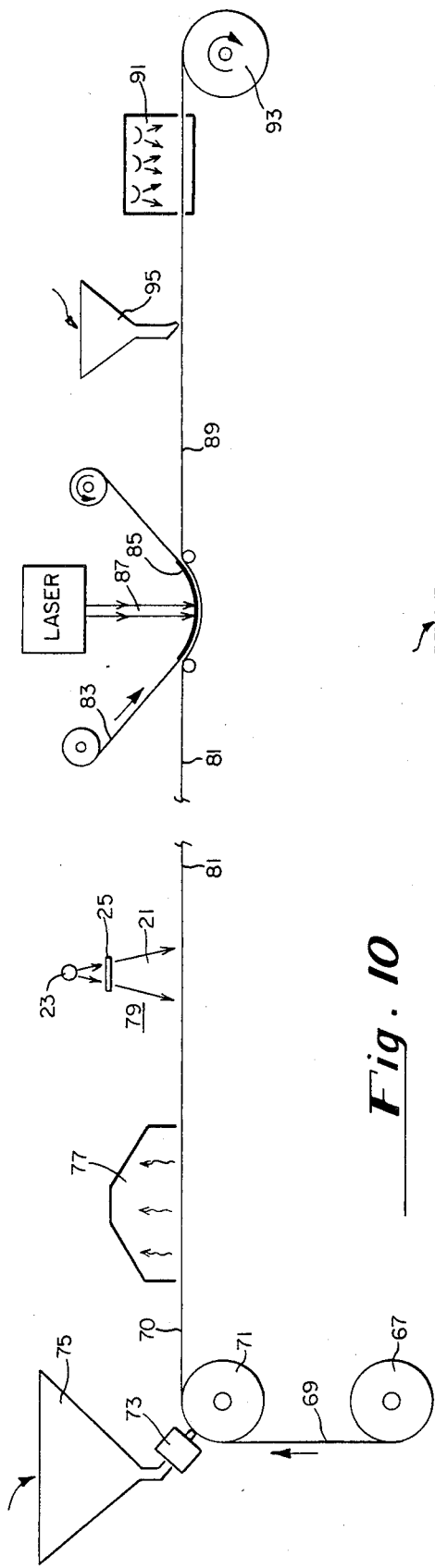
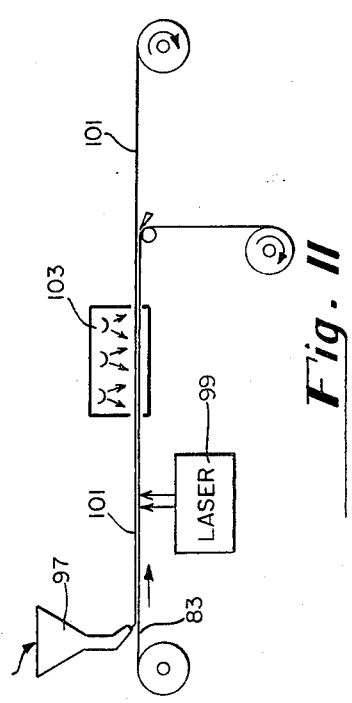
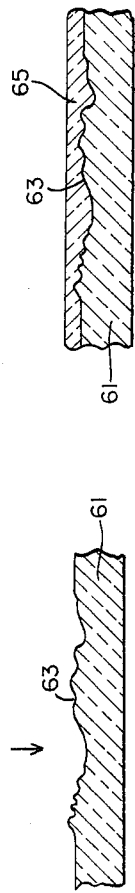
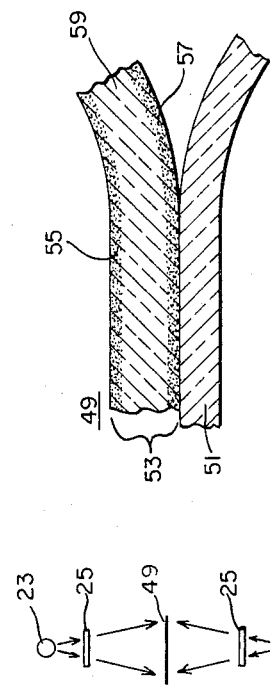

United States Patent Office 3,667,946
Patented June 6, 1972

3,667,946
SURFACE TREATMENT OF PHOTOPOLYMER FILM USED FOR RECORDING HOLOGRAMS
Eugene J. Sturdevant, Wilmington, Del., assignor to Holotron Corporation, Wilmington, Del.
Filed Sept. 23, 1970, Ser. No. 74,590
Int. Cl. G03c 5/12
U.S. Cl. 96—35.1
13 Claims

ABSTRACT OF THE DISCLOSURE

Techniques for treating and handling photopolymer film utilized to record in the visible or near visible range an electromagnetic radiation pattern such as a holographic interference pattern. Prior to exposure of a photopolymerizable film material to the radiation pattern, the film is polymerized at its surface primarily to improve mechanical rigidity of the film. A process of manufacturing elongated photopolymerizable recording film includes extruding a liquid monomer composition onto a substrate and polymerizing the monomer composition at least at its surface before the material is rolled or otherwise subjected to mechanical stresses. A technique for copying a master holographic movie onto photopolymerizable film includes extruding a liquid monomer composition onto the holographic movie, exposing the monomer layer to the holographic information recorded on the master film, polymerizing the remaining monomer and then separating the now hardened polymerized film from the master movie film.

BACKGROUND OF THE INVENTION

This invention relates generally to improvements in photopolymer films and more particularly to the use of improved photopolymer films as holographic detectors.

Photopolymer films have been available for some time for various applications and more recently have been used for recording holograms. Because of their low cost relative to silver emulsion photosensitive materials, photopolymer materials are especially desirable for recording a large number of copy holograms from a master hologram. Such a photopolymer film utilizes a base or substrate for physical strength which is coated with a photopolymerizable composition. Many specific photopolymerizable compositions are available and all contain a monomer, a binder and an initiator. The monomer composition contains, in general, an ethylenically unsaturated monomer such as a glycol, polyglycol diacrylate or dimethacrylate. The monomers are chosen to be fairly stable at room temperatures and may require small amounts of polymerization inhibitors for such stability. An initiator included in the composition is a single compound or mixture of compounds which absorbs electromagnetic radiation in the visible or near visible regions and uses this absorbed energy to start polymerization. A binder is also included in the composition and includes, in general, a high molecular weight polymer which holds the liquid monomer and initiator together in a film. The binder must be soluble in a satisfactory solvent for manufacturing. A satisfactory binder is cellulose acetate butyrate, a polyethyl acrylate or methacrylate.

Suitable recording materials for the layer or layers to be exposed to actinic radiation are the photopolymerizable compositions of Plambeck, U.S. Patent 2,760,863, Aug. 28, 1956; Notley, U.S. Patent 2,951,758, Sept. 6, 1960; Burg and Cohen, U.S. Patent 3,060,023, Oct. 23, 1962; and British specifications 997,396, July 7, 1965, and 1,047,569, Nov. 9, 1966.

After a holographic interference pattern has been recorded on such a photopolymer film, the hologram record appears to the eye to be transparent. The holographic information is recorded both in the volume of the photopolymerized composition and, to some degree, in relief of its surface. During exposure of the photopolymer film, microscopic areas thereof are alternately exposed to high and low intensity radiation of the holographic interference pattern. It has been theorized that the monomer diffuses from regions of low intensity exposure to regions of high intensity exposure during or after the exposure. It is believed that this diffusion is responsible for adjacent microscopic regions of the exposed photopolymer film having different light refractive indices, thereby recording the holographic interference pattern.

The photopolymerizable composition prior to exposure is tacky, deformable and has practically no strength by itself, therefore requiring a substrate. This fragile characteristic of the photopolymerizable material requires in all but the most delicate applications that the exposed surface of the composition be protected from abrasion and adhesion to other surfaces, at least until the composition is polymerized. One approach is to add a hard polymeric cover sheet to the surface of the photopolymerizable composition film opposite the substrate. It is this laminated structure that is exposed to the holographic interference pattern, usually through the cover sheet. The hologram interference pattern is recorded in the photopolymerizable composition film held between the substrate and cover sheet.

A primary use of photopolymer films now contemplated is for the mass production of holographic movies. A high quality master movie is constructed on an elongated photosensitive material with a plurality of individual holograms constructed along its length, each hologram corresponding to a frame of an ordinary photographic movie. This master holographic movie may be constructed on ordinary silver emulsion photosensitive materials or on a photopolymer material. It is desired to produce a large number of copies of this master movie on photopolymer film. A copy movie is made by drawing the master hologram movie and a photopolymer copy material along their lengths in intimate contact through a coherent radiation beam of a wavelength to which the photopolymer copy film is sensitive. Both the master and the copy films will be very long, in the nature of ordinary photographic movies, and thus require some method of storage, the most practicable method being the use of reels. Wrapping the photopolymer film on reels, as well as threading the film through automatic hologram copying equipment, subjects the laminated photopolymer film to substantial physical abuse.

A hologram formed on such a laminated photopolymer film after having been subjected to such mechanical treatment contains noise and is not capable of reconstructing high quality optical images. Therefore, it is primary object of this invention to provide a photopolymer film, a method of manufacturing this film and techniques for exposing the film to a holographic interference pattern in order to improve the quality of the resulting hologram and the optical image which it is capable of reconstructing.

SUMMARY OF THE INVENTION

When a laminated three-layer photopolymer film is wrapped around a spool, there are unequal tensions in the substrate and cover layers since they travel paths of slightly different radii of curvature. These unequal tensions induce compression and sheer forces within the middle photopolymerizable composition layer. Since this middle layer composition is physically weak prior to its polymerization, it is unable to withstand these forces.

Large differences in mechanical characteristics between the substrate and cover sheet materials tend to amplify such undesirable effects upon the middle photopolymerizable composition layer.

These undesirable effects of rugged mechanical handling of a photopolymer film may be reduced by eliminating the cover sheet protecting the photopolymerizable composition. The physical protection afforded by the cover layer to the photopolymerizable composition may be provided by polymerizing a thin surface layer of the photopolymerizable composition film opposite the substrate. Depending upon the particular photopolymerizable composition utilized, the surface of the composition layer may be polymerized chemically, ultrasonically, thermally or with electromagnetic energy. Various general techniques are described in U.S. Pats. 3,210,187—Thommes and 3,259,499—Thommes. Since the photopolymerizable composition layer is desired, in the applications contemplated herein, to record an electromagnetic radiation pattern in the visible or near visible wavelength range, such as a holographic interference pattern, it is most convenient to polymerize its exposed surface with electromagnetic radiation within the visible or near visible range prior to exposing the composition to the light pattern to be recorded. A photopolymerizable composition absorbs energy in amounts dependent upon the wavelength of radiation. Exposure of the composition to a holographic interference pattern is at an electromagnetic radiation wavelength matched to the absorptive characteristics of the composition so that the entire thickness of the composition film is polymerized according to the holographic interference pattern. The pre-exposure of the photopolymerizable composition, however, is preferably at a radiation wavelength that is absorbed to a much higher degree than is the radiation wavelength used subsequently to expose the composition to a holographic interference or other pattern. This assures that a pre-exposure radiation will be substantially totally absorbed by the photopolymerizable composition in a thin surface layer thereof, thereby leaving a major portion of the thickness of the composition layer unpolymerized by the pre-exposure. This major portion of the layer is subsequently polymerized by exposure to the holographic interference or other radiation pattern to be recorded on the photopolymer film through the polymerized surface layer.

Surface polymerization results in a photopolymer film with a hard protective surface. The film may then be rolled and contacted by a liquid gate during its exposure to a holographic interference pattern with the remaining polymerizable composition being subjected to reduced mechanical forces. The remaining photopolymerizable material under the polymerized surface layer is protected from oxygen in the surrounding atmosphere which can affect the polymerization process during a subsequent exposure to a holographic interference or other radiation pattern. These beneficial results have been accomplished without need for a laminated cover sheet accompanied by the problems imposed when the photopolymer film is rolled and used in mechanical equipment.

A surface relief pattern on a polymerized layer of an ordinary laminated photopolymer film exposed to a holographic interference pattern contributes noise to a reconstructed image. This noise may be reduced by eliminating the surface relief pattern without losing a significant amount of holographic information or otherwise affecting the quality of images reconstructed therefrom. Polymerization of the skin of the photopolymerizable film composition, as described hereinabove, reduces shrinkage at the skin during a subsequent exposure to a holographic interference pattern, thereby reducing surface relief noise characteristic of an exposed laminated photopolymer film. Any undesirable surface relief resulting after exposure to a holographic interference pattern may be removed by coating the polymerized radiation pattern carrying layer to make a smooth surface thereover. This coating may be one of several types such as a thermal setting material, a solvent evaporating coating or a polymerizable material. It is preferably extruded in a liquid form onto the film to be coated. The polymerizable material, if utilized, is preferably coated over the film after exposure to the holographic pattern but prior to a final or post-exposure of electromagnetic radiation in the visible or near visible range. The post-exposure fixes the light pattern recorded therein and also uniformly polymerizes the coating material to form a hard protective layer.

According to another aspect of the present invention, a process is provided for coating an elongated substrate, after being unrolled from a storage spool, with a liquid polymerizable material. A solvent in the polymerizable composition is evaporated from the composition, and the skin of the polymerizable composition is polymerized to form a protective layer, as discused hereinabove. Between these two operations (coating and skin polymerization), the coated substrate is kept free of rolling, physical contact with other objects and other mechanical abuse. Once the skin of the polymerizable composition has been polymerized, the film may be stored on rolls or immediately exposed to the holographic interference or other light pattern to be recorded thereon.

According to another aspect of the present invention, the polymerizable composition is extruded in a liquid form onto a master hologram film which is to be copied. The master hologram film acts as the substrate. The film is illuminated in a manner that the holographic interference pattern carried thereby is exposed onto the polymerizable composition layer and recorded therein. The exposed polymerizable composition layer is post-exposed to polymerize any remaining monomer of the composition. The completely polymerized layer is then physically rigid and can be removed from the master photographic film. The polymerized layer may itself be strong enough to form a hologram film copy, or it may be attached, for added strength, to a substrate after separation from its master.

For a more detailed disclosure of the invention and for further objects and advantages thereof, reference is made to the following description taken in conjunction with the accompanying drawings.

BRIEF DESCRIPTION OF THE DRAWINGS

FIG. 6 shows pre-exposure of a photopolymer material according to another aspect of the present invention;

FIG. 7 is an enlarged cross-sectional view of a photopolymer after pre-exposure according to the technique of FIG. 6;

FIG. 8 shows a typical photopolymerizable layer after exposure to a holographic interference pattern when the polymerizable layer has not been pre-exposed;

FIG. 9 shows the exposed photopolymerizable layer of FIG. 8 with the addition of a protective coating;

FIG. 10 shows a process for manufacturing and exposing photopolymer film material; and FIG. 11 shows yet another process for manufacturing and exposing a photopolymer film material.

DESCRIPTION OF THE PREFERRED EMBODIMENTS

Figure 1:
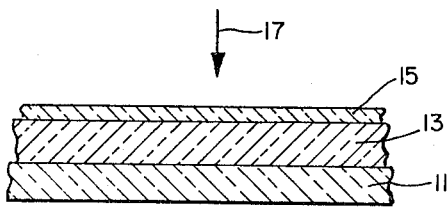
FIG. 1 is an enlarged cross-sectional view of a laminated photopolymer film.

Referring to FIG. 1, a cross-sectional view of a photopolymer film as presently utilized in various processes is shown. A flexible substrate 11 may be any one of several commercially available thin polymeric films and has as a purpose the addition of strength to the composite film. A photopolymerizable layer 13 is carried by the substrate 11. Prior to polymerization by exposure to electromagnetic radiation in the visible or near visible range or otherwise, the layer 13, lacks physical strength. As a protection for the photopolymerizable composition layer 13, a cover sheet 15 is applied thereto and may be one of several commercially available polymeric films. The cover sheet 15 is generally much thinner than the substrate 11 and has as a function only to protect the surface of the photopolymerizable composition layer 13. When the photopolymer film of FIG. 1 is exposed, light is directed through the cover sheet 15 generally in the direction shown by the arrow 17.

There are a large number of specific compositions which may be utilized as the photopolymerizable layer 13 which are effective in recording light patterns. One such composition preferred for recording holographic interference patterns is given below. The following components are dissolved in sufficient solvent to make a total of 800 grams:

(a) Cellulose acetate butyrate (ca. 17% butyryl, ca. 29.5% acetyl, and ca. 1.5% hydroxyl; viscosity of 115 to 188 poises as determined by ASTM Method D–1343–54T in the solution described as Formula A, ASTM Method D–871–54T)—52.0 grams (b) Triethyleneglycol diacrylate (commercial material with 0.05 to 0.10% hydroquinone added as a thermal inhibitor)—58.0 grams (c) 2-o-chlorophenyl-4,5 - di(m-methoxyphenyl)-imidazolyl dimer—6.0 grams (d) (3,4-dimethoxyphenyl) - bis(2 - methyl - 4 - diethylamino-phenyl)methane—3.0 grams (e) N-phenylglycine—0.22 gram (f) Ethylene bis (2-oxyethylacetate)—2.0 mls.

(g) Solvent: 10 weight percent 1,2-dichloroethane 90 weight percent dichloromethane This solution is coated on a clear polyethylene terephthalate film support about 100 μm. thick to give a dried coating weight of 1.0 to 2.0 mg./cm.$^2$.

Figure 2:
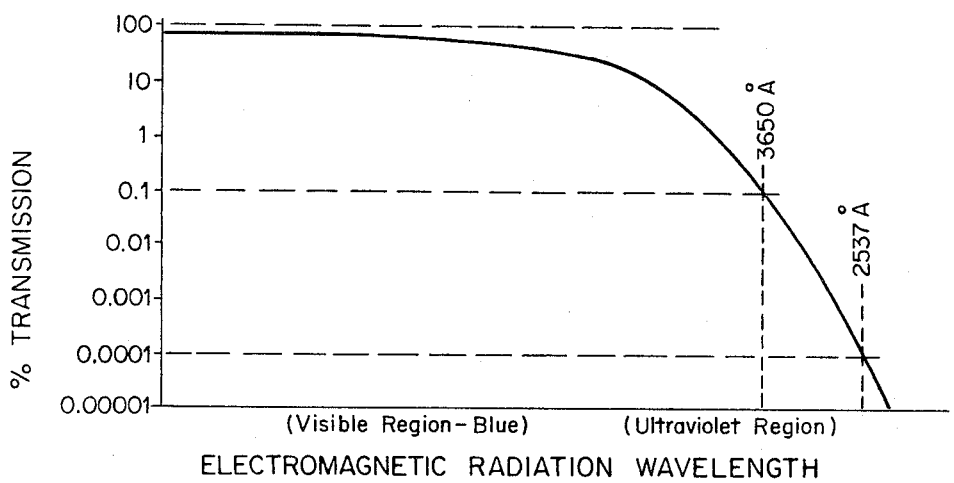
FIG. 2 shows a typical light transmission characteristic of a photopolymerizable film material.

The approximate transmission characteristics of compositions such as the specific composition given above are shown generally in the graph of FIG. 2. Such film photopolymerizable compositions are nearly transparent to electromagnetic radiation within the visible light region but becomes highly absorptive at shorter wavelengths in the ultraviolet region. When electromagnetic energy of a wavelength within this near visible region of high absorption (low transmission) is directed against the photopolymerizable composition, a large proportion of the incident radiant energy is absorbed by the composition to initiate the polymerization process therein. A photopolymerizable layer 13 of about 0.6 mil has been satisfactory for recording holographic interference patterns thereon with a coherent radiation wavelength of 3650 angstroms. At this wavelength, the photopolymerizable composition absorbs about 99.9% of the energy incident thereon.

Figure 3:
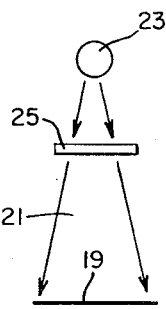
FIG. 3 illustrates pre-exposure of a photopolymer film according to one aspect of the present invention.

It is desirable to eliminate the cover 15 of the photopolymer film shown in FIG. 1 in order to reduce deformation of the rather plastic photopolymerizable composition layer 13 when the film is rolled or otherwise subjected to significant mechanical forces. It has been found that the covering 15 may be removed if the upper skin of the photopolymerizable composition layer 13 is polymerized. Referring to FIG. 3, a preferred technique for polymerizing a skin of the photopolymerizable composition layer of the type for recording light patterns is illustrated. A photopolymer film 19 including a substrate and a photopolymerizable coating, without a cover thereover, is exposed to electromagnetic radiation of a wavelength wherein the photopolymerizable composition is highly absorptive. For the composition whose characteristics are illustrated in FIG. 2, this pre-exposure is accomplished with ultraviolet radiation 21 derived from a mercury arc lamp 23 and an interference filter 25 which limits the radiation 21 to the mercury arc lamp line about 2537 angstroms.

Figure 4:
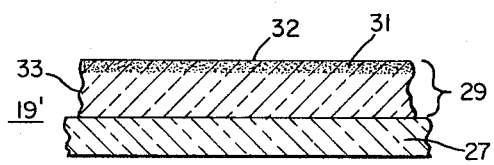
FIG. 4 is an enlarged cross-sectional view of a photopolymer film after pre-exposure thereof by the technique of FIG. 3.

As can be seen from FIG. 2, the photopolymerizable composition is highly absorptive at the pre-exposure wavelength of 2537 angstroms. Referring to FIG. 4, the photopolymer film 19 is shown as a pre-exposed film 19' in an enlarged cross-section to include a substrate 27 and a photopolymerizable layer 29. After pre-exposure according to FIG. 3, a thin layer 31 of the photopolymerizable composition layer 29 (FIG. 4) is polymerized to form a mechanically rigid protective covering for the remaining volume 33 of the coating 29 which is primarily unpolymerized. It will be understood, of course, that the polymerized skin layer 31 will probably not have a sharp lower boundary as shown in FIG. 4 for convenience. The degree of polymerization from pre-exposure according to FIG. 3 of the photopolymerizable composition layer 29 of FIG. 4 is a function at any point thereof of its distance from its top surface 32. The pre-exposure radiation beam 21 is chosen to be of a wavelength so that the layer 29 is highly absorptive to the energy, thereby absorbing nearly all the pre-exposure radiation energy a short distance within the layer from the surface 32. Thus it can be seen the importance of choosing the pre-exposure wavelength to be more highly absorbed by the photopolymerizable material layer than is the radiation to which the layer is subsequently exposed to the holographic interference or other radiation pattern to be recorded in the remaining monomer of the layer. The photopolymerizable layer 29 is made thick enough so that after polymerizing its skin 31, a substantially unpolymerized layer 33 remains having an optimum thickness for the electromagnetic radiation recording application contemplated.

Figure 5:
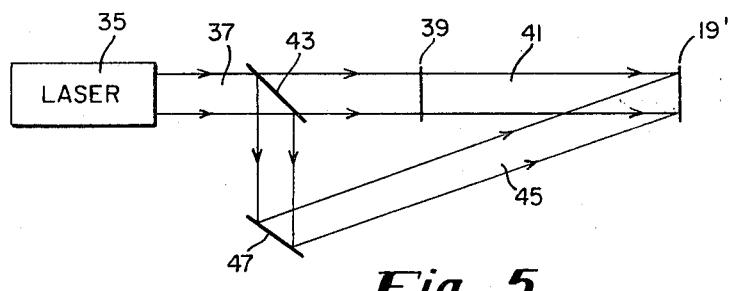
FIG. 5 schematically illustrates a technique for constructing an off-axis hologram.

A radiation pattern is recorded on the film 19' by illumination through the polymerized skin 31. Referring to FIG. 5, a typical technique for forming an off-axis hologram is illustrated. A source 35 of monochromatic, spatially coherent electromagnetic radiation of a wavelength of about 3650 angstroms generates a coherent ultraviolet beam 37. The beam 37 is passed through an object 39, such as an ordinary photographic transparency, and thus as an object-modified beam 41 onto the pre-exposed photopolymer film 19'. A beam splitter 43 is inserted within the beam 37 to divert a portion of its intensity into a reference beam 45 which is reflected from a mirror 47. Interference of the object-modified beam 41 and the reference beam 45 displaced at a finite angle thereto forms an interference pattern at the photopolymer film 19'. This interference pattern includes alternate microscopic regions of high and low intensity across the film 19' and, thereby, polymerizes the remaining monomer region 33 (FIG. 4) of the photopolymerizable layer 29 according to these intensity variations. The result, after proper exposure to the interference pattern, is a completely polymerized photopolymer film 19' in which the interference pattern is recorded thereacross in the form of a varying refractive index. When the completely polymerized photopolymer material 19' is illuminated with monochromatic, spatially coherent radiation, an image of the object transparency 39 is reconstructed in space.

A further use of the pre-exposure technique according to this invention is illustrated with respect to FIGS. 6 and 7. A photopolymer film 49 having only a substrate 51 and a photopolymerizable layer 53 is illuminated from both sides with electromagnetic radiation of a wavelength highly absorbed by the layer 53. The photopolymer film, after such exposure, has protective polymerized layers 55 and 57 on either side of a yet-to-be-polymerized monomer composition 59. An advantage of polymerizing both opposing skins of the photopolymerizable material 53 is that the layer 53 may be removed from its substrate 51 before exposure to a holographic interference or other radiation pattern, which pattern selectively polymerizes the remaining monomer 59. This double pre-exposure makes the layer 53 strong enough to be handled without a supporting substrate.

FIG. 8 illustrates in an exaggerated form the effects of surface shrinkage after exposure of a photopolymerizable composition film 61 to a radiation pattern such as a holographic interference pattern. The surface 63 becomes uneven as a result of the shrinkage occurring from non-uniform polymerization of the composition 61. When it is a holographic pattern that is recorded in the film 61, the uneven surface relief 63, although containing some useful information, also undesirably scatters reconstructing light that is directed through the layer 61. This light scattering superimposes noise over the desired information that is reconstructed from the hologram. An advantage of uniformly polymerizing a skin of the photopolymerizable composition film prior to exposing the film to a radiation pattern to be recorded thereon, as described earlier, is that the surface shrinkage, and thus the resulting undesirable surface relief pattern, is minimized.

When the pre-exposure technique is not utilized, the surface relief 63 of FIG. 8 may be eliminated as shown in FIG. 9 wherein a liquid coating 65 is applied thereover and allowed to harden to form a smooth surface. This coating treatment preferably utilizes the same monomer composition as the photopolymerizable layer 61 in which the desired light pattern has been recorded. After the monomer is applied as a liquid coating 65, it is polymerized by application of appropriate electromagnetic radiation of uniform intensity to evenly and uniformly harden the coating 65 by its polymerization. Alternatively, the coating 65 may be applied to the layer 61 after exposure to a holographic pattern but before post-exposure completes polymerization of the layer 61. A single post-exposure to electromagnetic radiation the coated film then provides the necessary post-exposure of the layer 61 as well as simultaneously polymerizing the protective layer 65.

A continuous manufacturing and exposing process utilizing the pre-exposure technique of the present invention is illustrated in FIG. 10. A roll 67 stores a quantity of substrate 69 which is drawn over another roll 71. An extruder 73 applies to the substrate 69 at the roll 71 an appropriate photopolymerizable material in liquid form from a storage hopper 75. A coated substrate 70 is then drawn in a straight line path to prevent disturbing the uniformity of the photopolymerizable liquid layer applied to the substrate. The coated substrate 70 is drawn through a dryer 77 to extract any solvent that may have been included in the photopolymerizable material in order to maintain it in a liquid state. The dried coated substrate is then passed through a pre-exposure station 79 which polymerizes a skin of the photopolymerizable composition layer, as discussed hereinbefore. This polymerized skin gives the required mechanical stability to the photopolymerizable composition layer so that a resulting photopolymer film 81 may be rolled, pinched or otherwise mechanically handled without damaging the unpolymerized composition thereof.

The treated film 81 may be stored for later use on rolls or may be utilized as part of continuous process with a holographic or other light pattern recorded thereon. An example of a process of exposing the photopolymer film 81 is shown in FIG. 10 for copying a holographic movie thereon from a master holographic movie film 83. The master film 83 is drawn about a transparent support 85 through a coherent radiation beam 87, thereby reconstructing therefrom at least one first order diffracted beam. This first order diffracted beam is recorded on the photopolymer copy material 81 as a new hologram by interference with an undiffracted portion of the coherent beam 87 that passes through the master film 83. The copy photopolymer film 81 is drawn through the coherent beam 87 without a velocity relative to the master film 83, preferably by being maintained in intimate contact with the film 83. The exposed film 89 is then passed through a post-exposure compartment 91 which uniformly illuminates the film 89 with a plurality of mercury lamps selected to emit radiation within the ultraviolet range. This post-exposure completely polymerizes any monomer remaining in the film 89 after the hologram pattern exposure to form a finished holographic movie copy which is stored on a reel 93 for subsequent playback.

For added strength and protection, a liquid covering is optionally extruded by an apparatus 95 onto the exposed copy film 89 prior to its passing through the post-exposure compartment 91. When a covering is desired to be applied, the preferred material is a photopolymerizable composition and may be the same as that extruded onto the substrate 69 by the extruder 73. Uniform exposure of this photopolymerizable composition coating forms a uniform and hard additional protective coating. As previously discussed, such a coating is most desirable for photopolymer film which has not been polymerized at its surface prior to exposure to a holographic pattern. Such a coating may also be desirable for certain applications when a pre-exposure surface polymerization has been accomplished.

It will be noted in the photopolymer film manufacturing and exposure processes illustrated with respect to FIG. 10 that a substrate must be utilized for strength. A photopolymer film manufacturing and exposure process that eliminates the need for a separate substrate film is illustrated with respect to FIG. 11 wherein the master film 83 to be copied itself serves as a substrate. An apparatus 97 extrudes a photopolymerizable composition in its liquid form onto the master film 83. A source 99 of monochromatic, spatially coherent electromagnetic radiation reconstructs from the master film 83 an object image carrying wavefront which is then recorded on the photopolymerizable coating 101. The photopolymerizable coating 101 and the master holographic film 83 are passed through a post-exposure compartment 103 to complete polymerization of the coating 101. The completely polymerized coating 101, which now has a certain degree of physical strength, is separated from the master film 83. The separated photopolymer film 101 may be applied to a substrate after separation from the master film 83, or may be utilized by itself. A post-exposure coating may be added for physical strength and to reduce noise by light scattering during reconstruction thereof. It will be noted that the configuration of FIG. 11 requires no liquid gate between the photopolymerizable material and the master holographic film 83. As a result of this and the fact that there is no mechanical handling of the photopolymerizable composition prior to exposure to the desired radiation, pattern, pre-exposure according to the present invention to polymerize a surface layer of the photopolymerizable material is unnecessary.

It shall be understood that the invention is not limited to the specific arrangements shown, and that changes and modifications may be made within the scope of the appended claims.

It is claimed:

1. A method of recording an electromagnetic radiation pattern in a photopolymerizable composition film, comprising the steps of:
   polymerizing a surface layer of said film to form a protective skin over the remaining photopolymerizable composition, and
   exposing the remaining photopolymerizable composition of said film to an electromagnetic radiation pattern through the polymerized protective skin, thereby forming a record of said pattern.

2. The method according to claim 1 wherein the step of polymerizing a surface layer of said film includes subjecting said film to electromagnetic radiation of substantially uniform intensity thereacross.

3. The method as defined in claim 1 wherein said electromagnetic radiation pattern includes the holographic interference pattern formed by intersecting two mutually coherent beams at a finite angle with each other at said film, one of said coherent beams containing information to be recorded and the other of the coherent beams serving as a phase reference.

4. The method according to claim 1 comprising the additional steps of:
coating the exposed film with a thin layer of liquid photopolymerizable material, and
polymerizing said coating by exposing it to electromagnetic radiation of substantially uniform intensity thereacross.

5. A method of recording an electromagnetic radiation pattern on a film including a photopolymerizable composition layer characterized by variable electromagnetic radiation absorption as a function of wavelength in the visible or near visible ranges, comprising the steps of:
exposing the film to electromagnetic radiation about a first wavelength having substantially a uniform intensity thereacross to polymerize a surface layer of said photopolymerizable composition layer, thereby to form a protective skin over remaining photopolymerizable material, and
exposing the remaining photopolymerizable material through said polymerized skin to an electromagnetic radiation pattern about a second wavelength, said photopolymerizable composition being significantly more absorptive to electromagnetc radiation at said first wavelength than at said second wavelength.

6. The method according to claim 5 wherein the step of exposing the remaining photopolymerizable material to an electromagnetic radiation pattern includes interfering mutually coherent information carrying and reference radiation beams at a finite angle with each other at said film.

7. The method according to claim 6 wherein said information carrying beam is obtained directly from a physical object.

8. The method according to claim 6 wherein said information carrying beam is reconstructed from a master hologram that is illuminated with a coherent reconstructing beam, and said reference beam is that portion of said reconstucted beam passing though the master hologram but undiffracted thereby.

9. A method of treating an optical hologram with surface relief, comprising the steps of:
applying to said hologram surface a thin liquid coating of a photopolymerizable composition, and
exposing the coated hologram surface to electromagnetic radiation having substantially uniform intensity thereacross, thereby to polymerize the liquid coating and provide a smooth protective layer of the hologram.

10. A method of recording a coherent electromagnetic radiation off-axis holographic interference pattern on a film having a photopolymerizable composition layer, comprising the steps of:
exposing said film to said radiation pattern for a period sufficient to polymerize said composition in areas of maximum radiation intensity of said pattern but not in areas of minimum radiation intensity,
applying a liquid coating of photopolymerizable material directly to a surface of the exposed photopolymerizable composition layer, and
post-exposing said film to electromagnetic radiation to polymerize areas of said composition layer not polymerized by the previous exposure as well as to polymerize the coating material.

11. A method of producing long lengths of photopolymer film for recording an electromagnetic radiation pattern thereon, comprising the steps of:
coating a liquid photopolymerization composition onto a long length of substrate by drawing the substrate past an extruder, and
passing the coated substrate in substantially a straight line from the extruder through a beam of electromagnetic radiation which polymerizes only a surface skin of said photopolymerizable composition.

12. A method of copying long lengths of a holographic movie, comprising the steps of:
coating a liquid photopolymerizable composition onto said holographic movie by drawing the movie in a direction of its length past an extruder,
passing the coated holographic movie substantially in a straight line from the extruder through a beam of coherent electromagnetic energy incident on the movie to which the photopolymerizable composition is sensitive, thereby to expose said composition to the holographic movie, and
peeling from the holographic movie the photopolymerizable composition layer after it has been substantially completely polymerized, whereby the layer is a copy of the holographic movie.

13. A method of producing long film lengths on which a holographic interference or other radiation pattern is recorded, comprising the steps of:
coating a liquid photopolymerizable composition layer onto a long length of substrate by drawing the substrate past an extruder,
passing the coated substrate in substantially a straight line from the extruder through a beam of electromagnetic radiation to polymerize a thin surface skin on each side of said layer while leaving photopolymerizable material in the middle of said layer between said skins,
peeling said layer from the substrate, and
exposing said layer through one of its polymerized skins to the radiation pattern, thereby to record said pattern in the middle photopolymerizable material of said layer.

References Cited
UNITED STATES PATENTS

| | | | |
|---|---|---|---|
| 3,144,331 | 8/1964 | Thommes | 96—35.1 X |
| 3,210,187 | 10/1965 | Thommes | 96—115 P |

RONALD H. SMITH, Primary Examiner

U.S. Cl. X.R.

96—27 H; 350—3.5